United States Patent [19]
Jensen

[11] Patent Number: 5,602,887
[45] Date of Patent: Feb. 11, 1997

[54] TOOL FOR PUSHING TIE ROD ASSEMBLY SUSPENDED IN DOWNCOMER ANNULUS OF BOILING WATER REACTOR

[75] Inventor: Grant C. Jensen, Morgan Hill, Calif.

[73] Assignee: General Electric Company, San Jose, Calif.

[21] Appl. No.: 532,198

[22] Filed: Sep. 22, 1995

[51] Int. Cl.⁶ .................................................. G21C 19/00
[52] U.S. Cl. .................... 376/260; 254/93 R; 254/133 R
[58] Field of Search .................................... 376/260, 463; 254/29 R, 93 R, 94, 120, 124, 133 R; 193/42

[56] References Cited

U.S. PATENT DOCUMENTS

| | | | |
|---|---|---|---|
| 3,907,252 | 9/1975 | Gaarder | 254/124 |
| 4,436,692 | 3/1984 | Stenabaugh | 376/260 |
| 4,548,783 | 10/1985 | Dalke et al. | 376/260 |

*Primary Examiner*—Daniel D. Wasil
*Attorney, Agent, or Firm*—James E. McGinness

[57] ABSTRACT

A tool for pushing a suspended shroud repair tie rod assembly radially inward in the downcomer annulus of a boiling water reactor. The tie rod pusher tool includes a pole adaptor for coupling to the end of a service pole, a pole adaptor extension having one end connected to the pole adaptor, a mounting channel connected to the other end of the pole adaptor extension, a hydraulic spreader mounted on the mounting channel, an adaptor bracket having a proximal end connected to the pivoting member of the hydraulic spreader, a rocker plate pivotably mounted on the distal end of the adaptor bracket, and a saddle mounted on the rocker plate. Using a service pole, the tool is lowered into a position whereat the saddle contacts the tie rod assembly when the hydraulic spreader is actuated. In the open position, the saddle bears against the tie rod assembly with sufficient force to displace the assembly radially inward until the clevis hook clears the clevis pin. Then the tie rod assembly is lowered until the tip of the clevis hook clears the bottom of the clevis pin. During descent of the tie rod assembly, it slides against the saddle of the pusher tool. The saddle is made of ultra-high-molecular weight polyethylene to prevent scratching of the tie rod assembly. When the pressurized fluid to the spreader is cut off, the bottom end of the suspended tie rod assembly drifts radially outward, causing the clevis pin to engage the clevis hook.

20 Claims, 7 Drawing Sheets

TOOL FOR PUSHING TIE ROD ASSEMBLY SUSPENDED IN DOWNCOMER ANNULUS OF BOILING WATER REACTOR

FIELD OF THE INVENTION

This invention relates to tooling which is useful in installing hardware in a nuclear reactor. In particular, the invention relates to tooling for installing hardware for stabilizing the core shroud of a nuclear reactor to resist deflection in response to a seismic event and/or loss-of-coolant accident (LOCA).

BACKGROUND OF THE INVENTION

Figure 1:
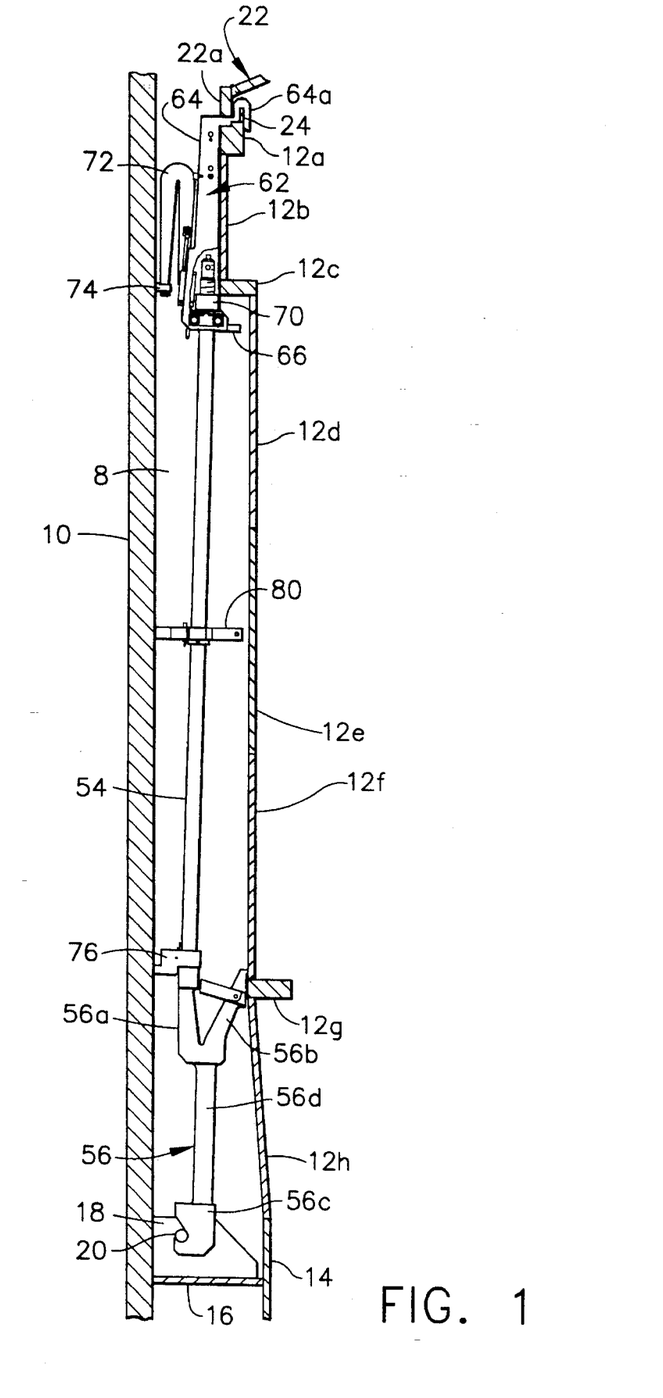
FIG. 1 is a sectional elevational view of core shroud repair hardware comprising a tie rod assembly for vertically restraining the shroud and wishbone springs for laterally restraining the shroud at the elevations of the top guide support ring and the core plate.

As seen in FIG. 1, a conventional boiling water reactor has a reactor pressure vessel 10 and a core shroud 12 arranged concentrically in the RPV with an annular region 8, commonly referred to as the "downcomer annulus" therebetween. The core shroud 12 is a stainless steel cylinder surrounding the nuclear fuel core comprising a plurality of fuel bundle assemblies (not shown). Each array of fuel bundle assemblies is supported at the top by a top guide and at the bottom by a core plate. During operation of the reactor, water is continuously recirculated down the downcomer annulus and then up through the core. This flow is induced by a multiplicity of jet pumps located in the downcomer annulus and driven by recirculation pumps (not shown) outside the reactor pressure vessel.

The core shroud 12 comprises a shroud head flange 12a for supporting the shroud head 22; a circular cylindrical upper shroud wall 12b having a top end welded to shroud head flange 12a; an annular top guide support ring 12c welded to the bottom end of upper shroud wall 12b; a circular cylindrical middle shroud wall comprising three sections 12d, 12e and 12f welded in series, with a top end of section 12d being welded to top guide support ring 12c; and an annular core plate support ring 12g welded to the bottom end of middle shroud wall section 12f and to the top end of a lower shroud wall 12h. The entire shroud is supported by a shroud support 14, which is welded to the bottom of lower shroud wall 12h, and by annular shroud support plate 16, which is welded at its inner diameter to shroud support 14 and at its outer diameter to RPV 10.

In the event of a seismic disturbance, it is conceivable that the ground motion will be translated into lateral deflection relative to the reactor pressure vessel of those portions of the shroud located at elevations above shroud support plate 16. Such deflections would normally be limited by acceptably low stresses on the shroud and its weldments. However, if the shroud weld zones have failed due to stress corrosion cracking, there is the risk of misalignment and damage to the core and the control rod components, which would adversely affect control rod insertion and safe shutdown.

Stress corrosion cracking in the heat affected zone of any shroud girth seam welds diminishes the structural integrity of shroud 12, which vertically and horizontally supports the core top guide and the shroud head 22. In particular, a cracked shroud increases the risks posed by a loss-of-coolant accident (LOCA). During a LOCA, the loss of coolant from the reactor pressure vessel produces a loss of pressure above the shroud head 22 and an increase in pressure inside the shroud, i.e., underneath the shroud head. The result is an increased lifting force on the shroud head and on the upper portions of the shroud to which the shroud head is bolted. If the core shroud has fully cracked girth welds, the lifting forces produced during a LOCA could cause the shroud to separate along the areas of cracking, producing undesirable leaking of reactor coolant.

A repair method for vertically restraining a weakened core shroud utilizes tensioned tie rods 54 coupled to the shroud flange 12a and to the shroud support plate 16, as seen in FIG. 1. The lower end of the tie rod/lower spring assembly hooks underneath a clevis pin 20 inserted in a hole machined into gusset plate 18, which plate is in turn welded to shroud support plate 16 and RPV 10. In addition, the shroud 12 is restrained laterally by installation of wishbone springs 56 and 72, which are components of the shroud repair assembly.

Referring to FIG. 1, the shroud restraint tie rod/lower spring assembly comprises a tie rod 54 having a circular cross section. A lower end of tie rod 54 is anchored in a threaded bore formed in the end of a spring arm 56a of lower spring 56. Tie rod 54 extends from the end of spring arm 56a to a position adjacent the outer circumferential surface of the top guide support ring 12c. The upper end of tie rod 54 has a threaded portion.

The lower spring 56 is anchored to a gusset plate 18 attached to the shroud support plate 16. The lower spring 56 has a slotted end which straddles gusset plate 18 (see FIG. 3) and forms a clevis hook 56c. The clevis hooks under opposite ends of a clevis pin 20 inserted through a hole machined in gusset plate 18. Engagement of the slotted end 56c with the gusset plate 18 maintains alignment of lower spring 56 under the action of seismic motion of the shroud, which may be oblique to the spring's radial orientation.

The tie rod 54 is supported at its top end by an upper support assembly 62 which hangs on the shroud flange 12a. A pair of notches or slots are machined in the shroud head ring 22a of shroud head 22. The notches are positioned in alignment with a pair of bolted upper support plate segments 64 of upper support assembly 62 when the shroud head 22 is properly seated on the top surface of shroud flange 12a. These notches facilitate coupling of the tie rod assembly to the shroud flange.

The pair of notches at each tie rod azimuthal position receive respective hook portions 64a of the upper Support plates 64. Each hook 64a conforms to the shape of the top surface of shroud flange 12a and the shape of the steam dam 24. The distal end of hook 64a hooks on the inner circumference of shroud dam 24.

The upper support plates 64 are connected in parallel by a top support bracket (not shown) and a support block 66 which forms the anchor point for the top of the tie rod. Support block 66 has an unthreaded bore, tapered at both ends, which receives the upper end of tie rod 54. After the upper end of tie rod 54 is passed through the bore, a threaded nut 70 is torqued onto the upper threaded portion of the tie rod 54.

As seen in FIG. 1, the assembly comprised of support plates 64 with hooks 64a, support block 66, tie rod 54, lower spring 56, clevis pin 20 and gusset plate 18 form a vertical load path by which the shroud flange 12a is connected to the shroud support plate 16. In the tensioned state, the upper support plates 64 exert a restraining force on the top surface of shroud flange 12a which opposes separation of the shroud 12 at any assumed failed circumferential weld location.

Lateral restraint at the elevation of the top guide support ring 12c is provided by an upper spring 72 having a double cantilever "wishbone" design. The end of the radially outer arm of upper spring 72 has an upper contact spacer 74 rotatably mounted thereon which bears against the inner surface of the wall of RPV 10.

Spring arm 56a of lower spring 56 laterally supports the shroud 12 at the core plate support ring 12g, against the vessel 10, via a lower contact spacer 76. The top end of spring arm 56a has a threaded bore to provide the attachment for the threaded bottom end (not shown) of tie rod 54. The member 56d connecting the wishbone spring arms 56a, 56b to clevis hook 56c is offset from the line of action between the lower end of tie rod 54 and clevis pin 20 to provide a vertical spring compliance in the load path to the tie rod. A middle support 80 is preloaded against the vessel wall at assembly by radial interference which bends the tie rod 54, thereby providing improved resistance to vibratory excitation failure of the tie rod.

Figure 3:
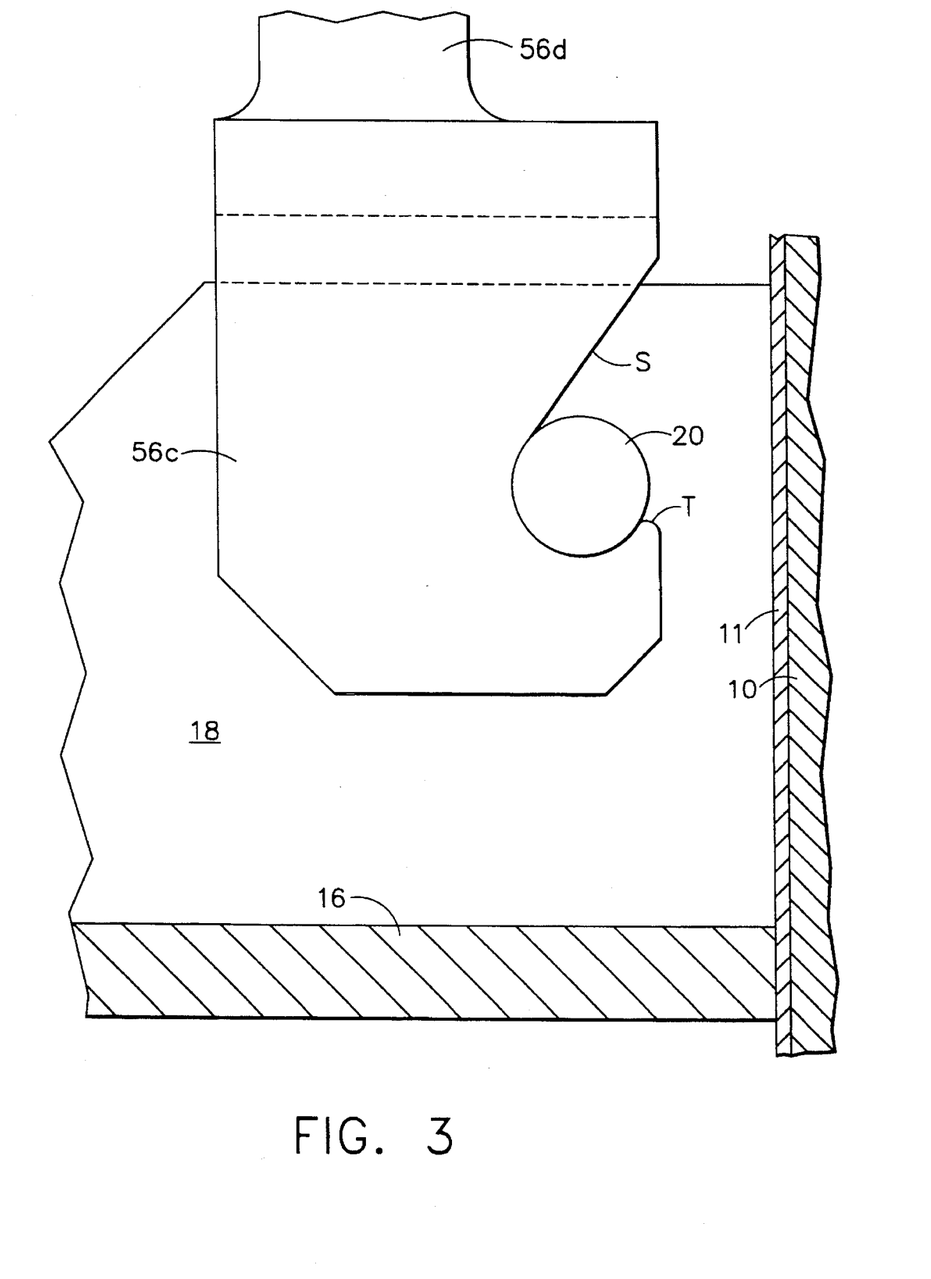
FIG. 3 is an elevation view of a clevis hook of a tie rod/lower spring assembly hooked under a clevis pin on a gusset plate during shroud repair hardware installation.

During installation of the shroud repair hardware shown in FIG. 1, the tie rod/lower spring assembly comprising tie rod 54 screwed into lower spring 56 is suspended from a cable and lowered into the annulus. During its descent, the assembly must be carefully maneuvered past various obstacles without damaging internal reactor components. Ultimately, the assembly is positioned so that it hangs plumb over the gusset plate. At this juncture, the tie rod/lower spring assembly must be maneuvered so that the clevis hook is hooked underneath the clevis pin on the gusset plate, as seen in FIG. 3. To accomplish this, the clevis hook at the bottom of the suspended assembly must be displaced radially inward in the downcomer annulus until there is radial clearance vis-a-vis the clevis pin. With the clevis hook in this radially inwardly displaced position, the tie rod assembly is lowered a few inches until the tip of the clevis hook clears the bottom of the clevis pin. Then the force displacing the bottom end of the suspended tie rod assembly radially inward is removed, allowing the lower spring clevis 56c to "drift" under the clevis pin 20. The tie rod assembly is now properly positioned and simply lifted up to engage the clevis pin in the clevis hook. After clevis hook 56c has been hooked under clevis pin 20, the lower end of the tie rod assembly is braced in the hooked position and the upper end of the tie rod assembly is uncoupled from the hoisting cable to allow the upper support assembly 62 to be installed, followed by upper spring 72.

SUMMARY OF THE INVENTION

The present invention is a tool for pushing the suspended shroud repair tie rod assembly radially inward in the downcomer annulus of a boiling water reactor during shroud repair hardware installation. Although the preferred embodiment is described with reference to the application wherein the bottom end of the tie rod assembly is displaced radially inward to effect engagement of the clevis hook with the clevis pin on the gusset plate, the tool of the invention is also useful for maneuvering the tie rod assembly past other obstructions during the assembly's descent in the annulus. The tool can be used to push on the lower spring, on the tie rod, on a strongback or cable supporting the tie rod/lower spring assembly. Nor is application of this tool limited to maneuvering shroud repair hardware. Any mass suspended in the downcomer annulus of a boiling water reactor can be pushed using this versatile tool.

In accordance with one preferred embodiment of the invention, the pusher tool comprises a pole adaptor for coupling to the end of a service pole, a pole adaptor extension having one end connected to the pole adaptor, a mounting channel connected to the other end of the pole adaptor extension, a hydraulic spreader mounted on the mounting channel, an adaptor bracket having a proximal end connected to the pivoting member of the hydraulic spreader, a rocker plate pivotably mounted on the distal end of the adaptor bracket, and a saddle mounted on the rocker plate.

Using a service pole, the tool is lowered into a position whereat the saddle contacts the tie rod assembly when the hydraulic spreader is actuated. The contacting surface of the saddle has a channel with a curved concave profile for receiving the pushed member. The hydraulic spreader, which resembles a duckbill, has a fixed member attached to the mounting channel and a pivoting member which pivots away from the fixed member in response to actuation of a hydraulic cylinder. In the open position, the concave surface of the saddle bears against a member of the tie rod/lower spring assembly with sufficient force to displace the contacted portion of the suspended tie rod assembly radially inward.

In a specific application, the bottom end of the assembly is displaced radially inward until the clevis hook clears the clevis pin installed on the gusset plate. Then the tie rod assembly is lowered a few inches until the tip of the clevis hook clears the bottom of the clevis pin. During this brief descent of the tie rod assembly, it slides against the saddle of the pusher tool. The saddle is made of ultra-high-molecular weight (UHMW) polyethylene or other suitable material to prevent scratching of the tie rod assembly. Alternatively, only the surface layer of the saddle is made of UHMW polyethylene.

When the pressurized fluid to the spreader is cut off, the suspended tie rod assembly drifts radially outward, causing the clevis pin to enter the clevis hook. Then the tie rod assembly is lifted to fully engage the clevis pin in the clevis hook prior to installing a vertical support tool which braces the clevis hook against the clevis pin from below.

In accordance with an alternative preferred embodiment, a roller made of made of UHMW polyethylene or other suitable material is rotatably mounted on the rocker plate in place of the stationary saddle. This configuration is especially useful when the member being pushed by the tool undergoes a lengthy descent while in contact with the pusher tool. For example, the roller can be configured to roll against the tie rod of the tie rod/lower assembly while the assembly is being lowered into the downcomer annulus.

An advantageous feature of the present invention is that a standard hydraulic spreader can be modified to suit the needs of different application by attaching interchangeable adaptor brackets. The length of the adaptor bracket, attached to the pivoting member of the hydraulic spreader, can be varied to achieve a corresponding radially inward displacement of the pushed member in response to hydraulic actuation. Alternatively, interchangeable rocking plates carrying either a stationary saddle or a roller can be mounted on the end of the adaptor bracket. This modular construction reduces the overall cost of shroud repair installation tooling by enabling interchangeable parts to be used at different shroud repair sites.

In accordance with the present invention, the tool for pushing the tie rod assembly radially inward can be installed and operated remotely. The tool is positioned by attaching the tool to the end of a service pole and then manipulating the handle of the service pole from a station on the refueling bridge. The tool is operated by actuating the supply of pressurized fluid, e.g., water, to the hydraulic cylinder by opening a valve at a water control station located outside the reactor pressure vessel.

DETAILED DESCRIPTION OF THE PREFERRED EMBODIMENTS

During the installation procedure, the tie rod/lower spring assembly (items 54 and 56 in FIG. 2) is lowered into the downcomer annulus 8. This is accomplished using a crane (not shown) on the refueling floor of the reactor. First, the tie rod/lower spring assembly must be raised from horizontal position on the refueling floor to a vertical position suspended from the end of the crane cable. This is accomplished by means of a tie rod adaptor which couples the upper end of the tie rod to the end of the cable. When the cable is wound, the upper end of the tie rod is lifted off the refueling floor into an upright position with all of the weight of the tie rod being supported by the cable. The tie rod/lower spring assembly can then be lowered into the annulus by unwinding the cable.

Figure 2:
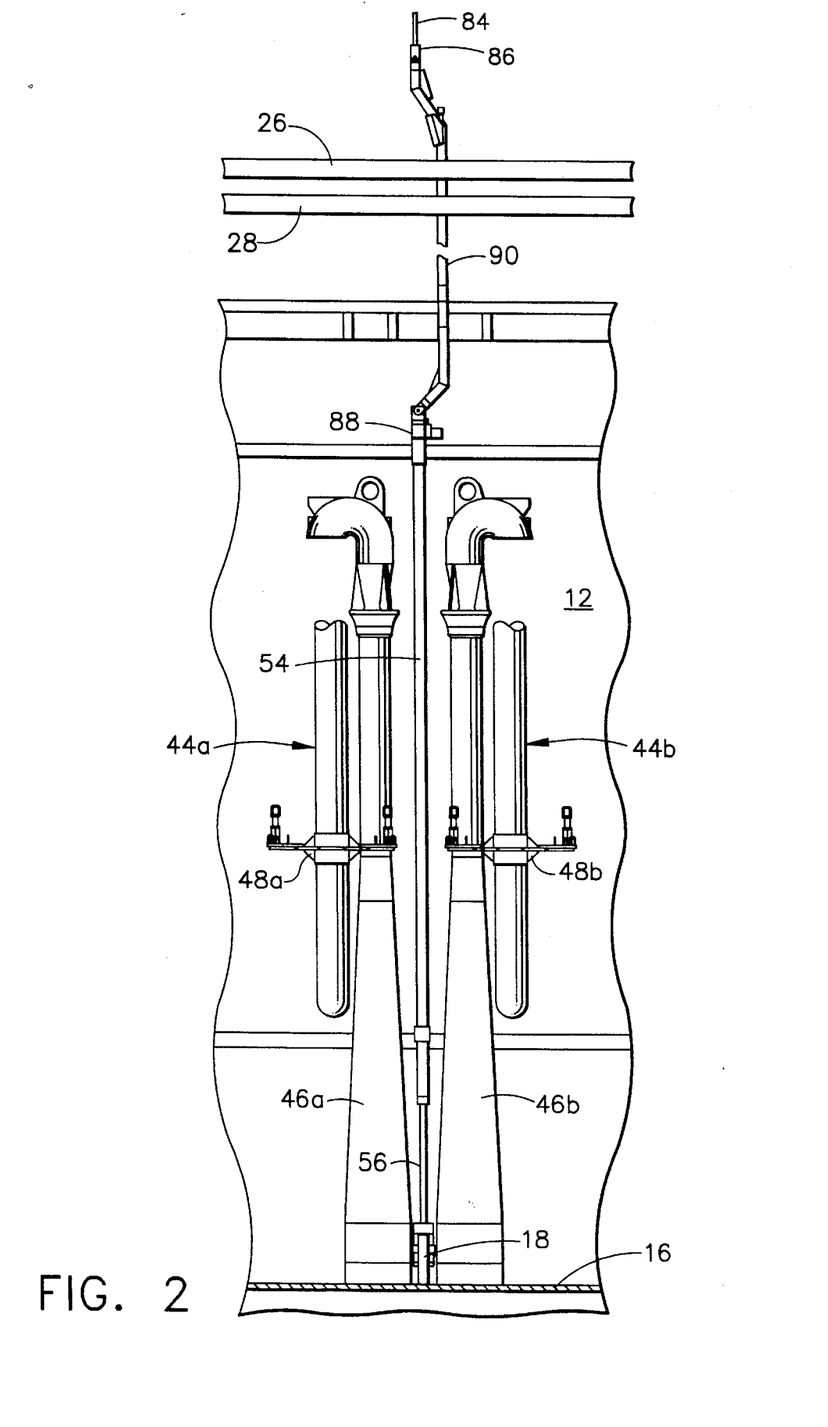
FIG. 2 is a radial elevational view showing the position of a tie rod/lower spring assembly relative to a pair of adjacent jet pump assemblies in a BWR.

Referring to FIG. 2, when vertical access to the downcomer annulus 8 is limited by internal reactor structures such as the feedwater sparger 26 and core spray header 28, a rigid frame or strongback 90 can be used to bypass the obstruction. The strongback is designed to circumvent the piping obstructions so that the tie rod/lower spring assembly is freely suspended from the end of the cable and the cable remains plumb. The tie rod strongback 90 is suspended from cable 84 via a cable adaptor 86 at its upper end. The lower end of the strongback 90 is coupled to the tie rod adaptor 88, which in turn couples to the top of the tie rod 54.

As the cable is lowered, the tie rod/lower spring assembly 54/56 must be guided into the narrow space between adjacent jet pump assemblies 44a and 44b (see FIG. 2). Maneuvering of the tie rod/lower spring assembly must be done with extreme care to avoid damaging reactor hardware such as the jet pump restrainer brackets 48a, 48b and the jet pump sensing lines (not shown).

In a specific application, the bottom end of the assembly is displaced radially inward until the clevis hook clears the clevis pin installed on the gusset plate. Then the tie rod assembly is lowered a few inches until the tip of the clevis hook clears the bottom of the clevis pin. During this brief descent of the tie rod assembly, it slides against the saddle of the pusher tool. The saddle is made of ultra-high-molecular weight (UHMW) polyethylene or other suitable material to prevent scratching of the tie rod assembly. Alternatively, only the surface layer of the saddle is made of UHMW polyethylene.

When the pressurized fluid to the spreader is cut off, the suspended tie rod assembly drifts radially outward, causing the clevis pin to enter the clevis hook. Then the tie rod assembly is lifted to fully engage the clevis pin in the clevis hook prior to installing a vertical support tool which braces the clevis hook against the clevis pin from below.

Ultimately, the assembly is positioned so that it hangs plumb over the gusset plate 18. At this juncture, the tie rod/lower spring assembly must be maneuvered so that the clevis hook 56c is hooked underneath the clevis pin 20 on the gusset plate 18, as seen in FIG. 3. To accomplish this, the clevis hook at the bottom of the suspended assembly must be displaced radially inward in the downcomer annulus until there is radial clearance vis-a-vis the clevis pin. With the clevis hook in this radially inwardly displaced position, the tie rod assembly is lowered a few inches until the tip T of the clevis hook 56c clears the bottom of the clevis pin 20. Then the force displacing the bottom end of the suspended tie rod assembly radially inward is removed, allowing the lower spring clevis 56c to "drift" under the clevis pin 20 until the latter contacts the inclined surface S of the clevis hook slot. The tie rod assembly is now properly positioned and simply lifted up to fully engage the clevis pin 20 in the clevis hook.

Figure 4A:
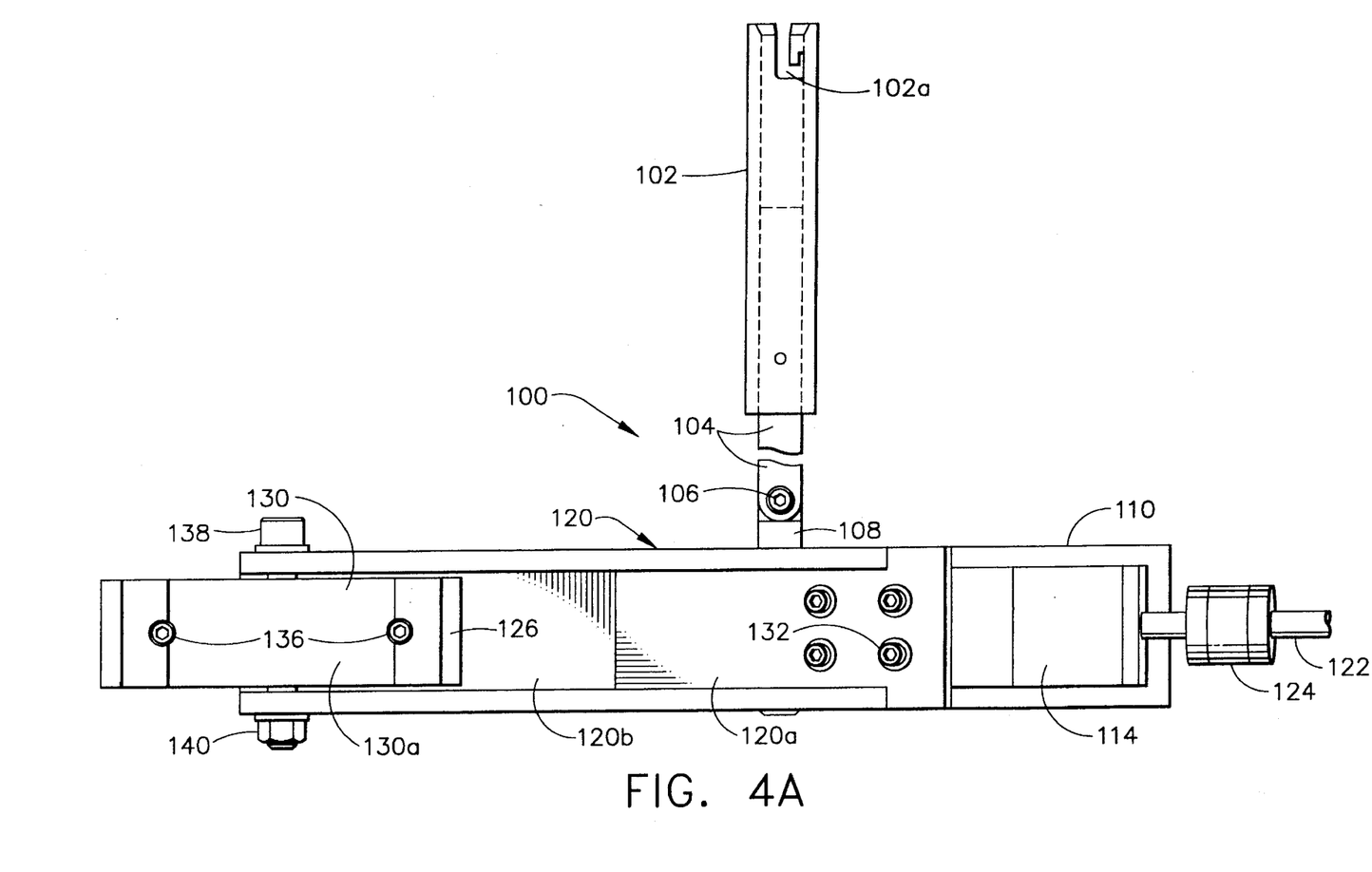
FIGS. 4A and 4B are front and side elevation views, respectively, of a pole-mountable hydraulic pusher tool with saddle in accordance with one preferred embodiment of the invention.
Figure 4B:
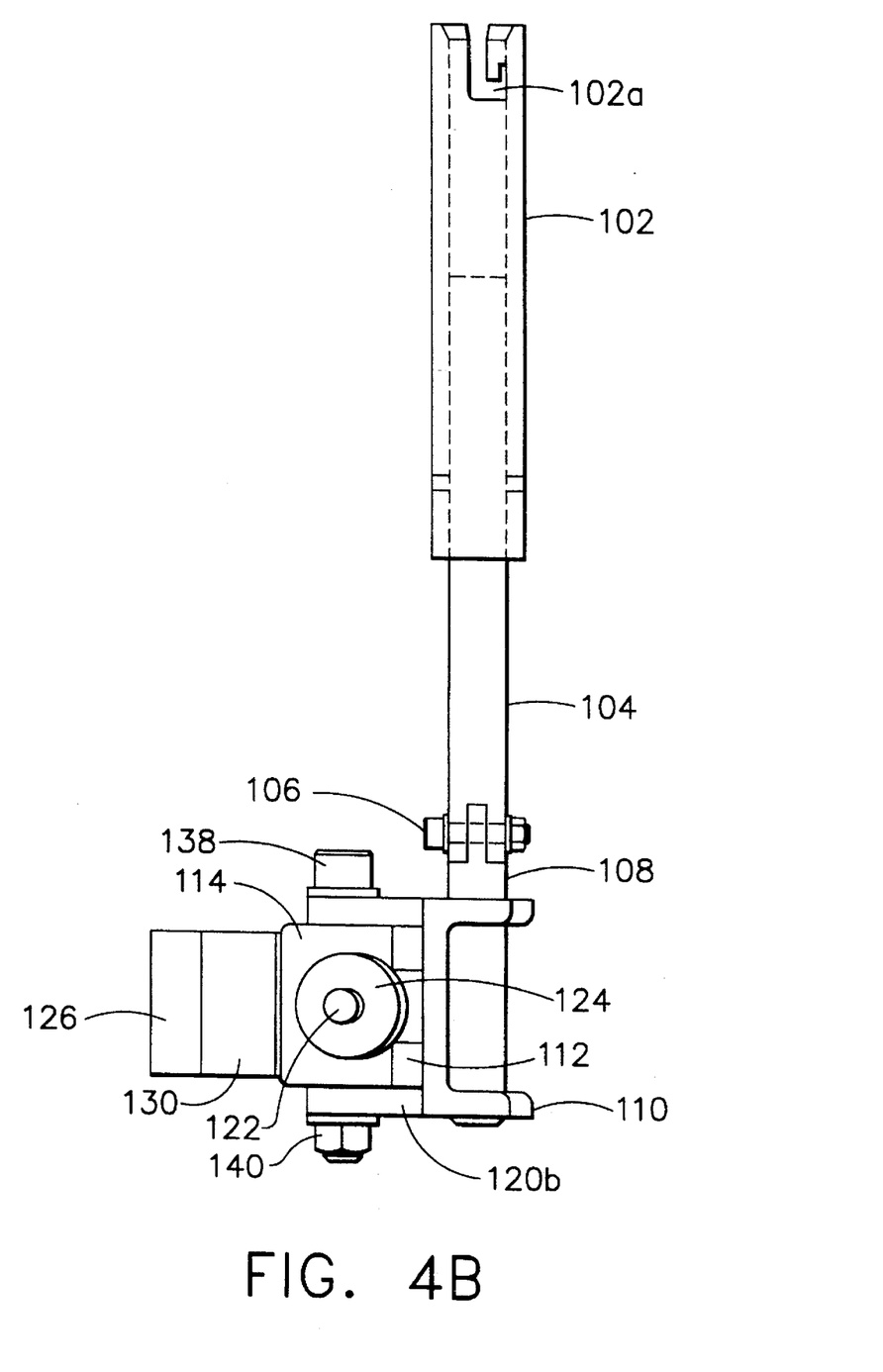

Referring to FIGS. 4A and 4B, the pusher tool 100 in accordance with one preferred embodiment of the invention comprises a pole adaptor 102 for coupling to the end of a service pole (not shown). In particular, the pole adaptor 102 has a pair of J-shaped slots 102a (only one of which is visible in FIG. 4A) for receiving respective pins on the end of the service pole (not shown). Pusher tool 100 further comprises a pole adaptor extension 104, the upper end of which is attached to the pole adaptor 102. Preferably, extension 104 is a rod made of aluminum alloy. The lower end of extension 104 has a clevis which is coupled to a support post 108 by a clevis pin 106, as best seen in FIG. 4B. The clevis arrangement allows the extension 104 and support post 108 to articulate, which facilitates passage of the tool through tight spots in the annulus during insertion and removal.

Figure 5:
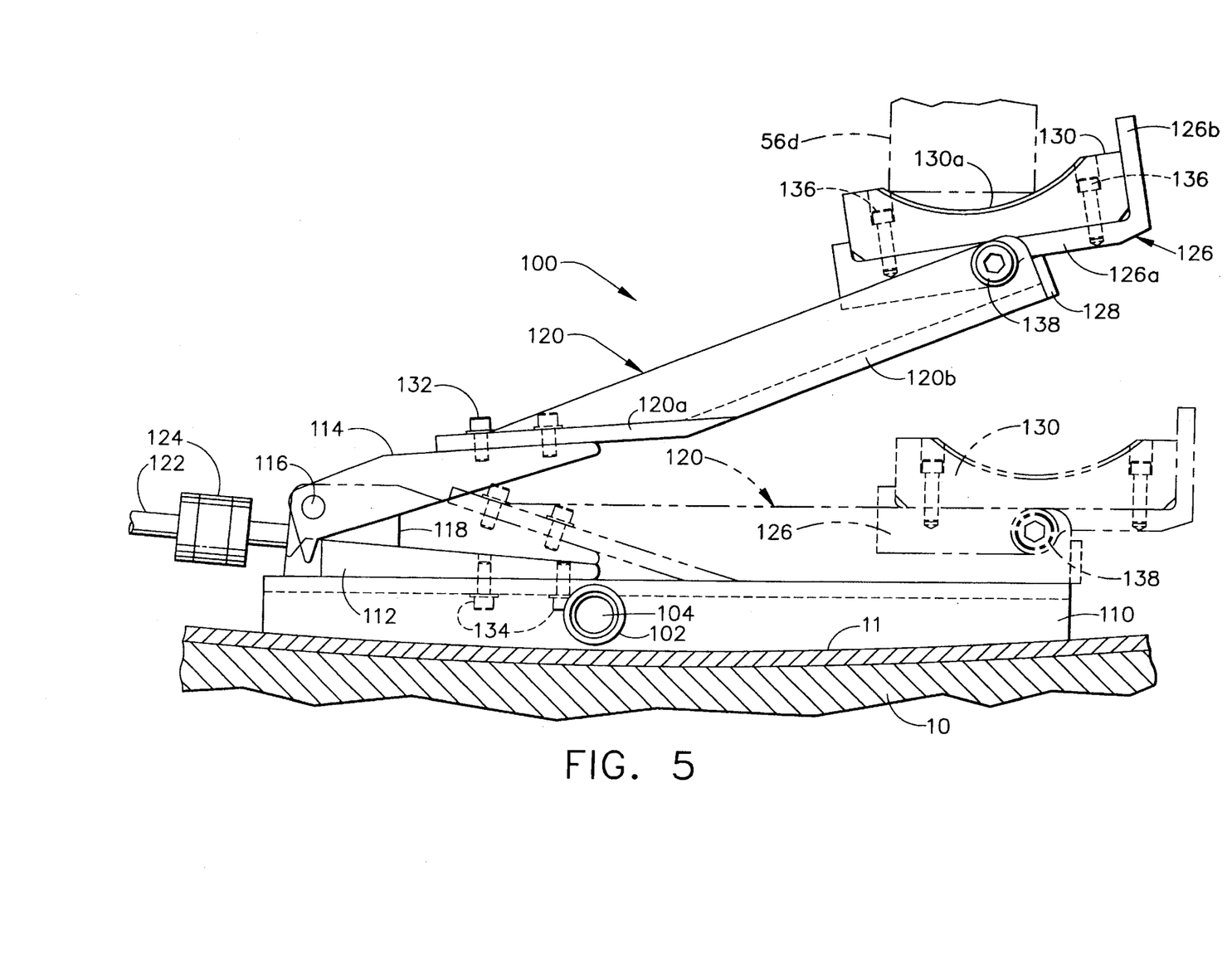
FIG. 5 is a top plan view of the pole-mountable hydraulic pusher tool with saddle of FIGS. 4A and 4B being used to push the bottom end of a tie rod/lower spring assembly radially inward. The solid lines indicate the open state in which the tool is pushing against the tie rod/lower spring assembly; the dashed lines indicate the closed state in which the tool is not pushing against the tie rod/lower spring assembly.

The support post 108 is securely mounted on a mounting channel 110. In particular, the support post can be inserted in a pair of coaxial holes (not shown) formed in the arms of the channel 110. The support post and channel are also preferably made of aluminum alloy. The arms of channel 110 may optionally have contoured reaction surfaces which conform to the contour of the cladded surface 11 of the RPV wall 10, which the channel is placed in contact with, as seen in FIG. 5. The face of the channel 110 is preferably planar and supports a hydraulic spreader or pry bar. The hydraulic spreader, which resembles a duckbill, has a fixed member or jaw 112 attached to the mounting channel 110 by screws 134 and a pivoting member or jaw 114 which is pivotably coupled to the fixed member 112 by means of a pivot pin 116. The pivoting member 114 pivots relative to the fixed member 112 about an axis which lies generally parallel to the flat face of mounting channel 110 in response to the supply of pressurized fluid, e.g., water, to a hydraulic cylinder 118 situated between the fixed and pivoting members. Hydraulic cylinder 118 is arranged such that the pivoting member 114 is pushed open when the piston of the hydraulic cylinder is extended.

The hydraulic cylinder 118 is connected to a source (not shown) of pressurized fluid via a hydraulic line 122 and a quick disconnect coupling 124. The piston of hydraulic cylinder is extended when pressurized fluid, e.g., water, is supplied to the cylinder and retracted when the supply of pressurized fluid is cut off. The end of the piston contacts the pivoting member 114 of the hydraulic spreader at a point which is offset from the axis of pivot pin 116. Thus, extension of the piston in response to actuation of the hydraulic cylinder produces a torque on the pivoting member 114 which causes it to rotate away from the fixed member 112. Preferably, a spring return is provided so that the pivoting member 114 retracts automatically when the hydraulic pressure is released.

The pusher tool 100 further comprises an adaptor bracket 120 having a proximal end connected to the pivoting member 114 of the hydraulic spreader via a set of four screws 132. The adaptor bracket 120 is a weldment of a plate 120a and a channel 120b, as best seen in FIG. 5. Plate 120a has four holes for passage of screws 132. At a distal end of the channel 120b, the channel arms have a pair of coaxial holes (not shown) for receiving a socket head shoulder screw 138. Screw 138, which is coupled to channel 120b by a nut 140, serves as a pivot pin for a rocker plate 126. The axis of pivot pin 138 is parallel to the axis of pivot pin 116 of the hydraulic spreader. The plate 120a, channel 120b and rocker plate 126 are all preferably made of aluminum alloy.

A saddle 130 is securely mounted on the rocker plate 126 by means of a pair of screws 136. (Preferably, screws 132, 134 and 136 are socket head cap screws.) Saddle 130 has a shallow depression 130a for receiving member 56d of the lower spring 56, as shown in FIG. 5. Depression 130a extends for the full height of the saddle and defines a contact surface which is a cylindrical section having a curved concave profile. The depression resists any tendency for the pushed member 56d to slide off of the saddle. Saddle is made of UHMW polyethylene or other suitable material to prevent scratching of member 56d as the latter descends relative to saddle 130 while in contact therewith.

The rocker plate 126 is pivotable about pivot pin 138 to allow the saddle 130 to adjust its orientation vis-a-vis the pushed member. As seen in FIG. 5, counterclockwise rotation of the rocker plate 126 relative to the adaptor bracket 120 will be blocked when the rocker plate contacts the base of the channel 120b. Conversely, clockwise rotation of the rocker plate 126 relative to the adaptor bracket 120 will be blocked when the rocker plate contacts a restrictor plate 128 which is affixed to the endface of channel 120b. Rocker plate 126 comprises a base 126a pivotably mounted on pivot pin 138 and an extension 126b on one side which extends generally perpendicular to said base 126a and beyond the portion of saddle 130 furthermost from base 126a. The projecting end of extension 126b of rocker plate 126 prevents side slippage of member 56d off of the saddle.

Referring to FIG. 5, the open state of the pusher tool is shown in solid lines and the closed state of the pusher tool is shown in dashed lines. In response to actuation of the hydraulic spreader, the pivot pin 138 travels along an arc. When the saddle contacts the member 54d, the rocker plate 126 adjusts so that the saddle will push member 54d radially inward. The amount of this radially inward displacement is a function of the length of the adaptor bracket 120 and the angle of rotation of pivoting member 114 of the hydraulic spreader. For different applications using the same hydraulic spreader, the radially inward displacement can be controlled by proper selection of the length of the adaptor bracket, or more specifically, the distance between the axis of pivot pin 116 and the axis of pivot pin 138. Interchangeable adaptor brackets can be attached to the hydraulic spreader using screws 132.

Figure 6:
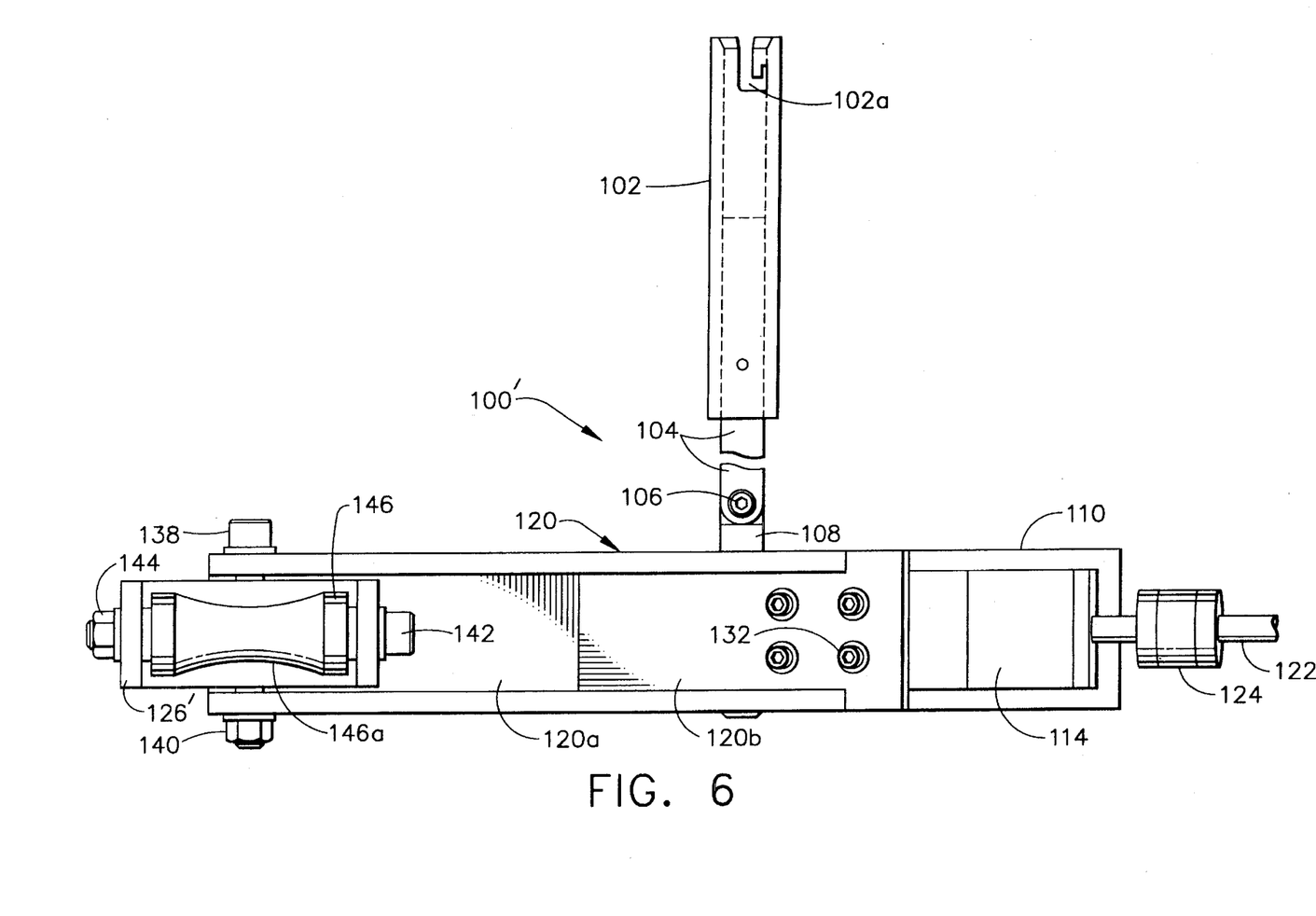
FIG. 6 is a front elevation view of a pole-mountable hydraulic pusher tool with roller in accordance with another preferred embodiment of the invention.

Similarly, interchangeable rocker plates can be attached to the end of the adaptor bracket. For example, as shown in FIG. 6, a rocker plate 126' carrying a roller 146 can be substituted for the rocker plate 126 and saddle 130 of the first preferred embodiment. The rocker plate 126' is in the form of a channel having apertured arms which support a pivot pin 142 coupled thereto by a nut 144. The roller is rotatably mounted on the pivot pin 142. A pusher tool having a roller is preferred when the member being pushed by the tool undergoes a lengthy descent while in contact with the pusher tool. For example, the roller can be configured to roll against the tie rod of the tie rod/lower assembly while the assembly is being lowered into the downcomer annulus. Roller 146 has a shallow depression 146a for receiving the tie rod 54. This depression extends around the circumference of the roller and defines a contact surface having a curved concave profile. The depression 146a resists any tendency for the tie rod 54 to slide off of the roller. Roller 146 is made of UHMW polyethylene or other suitable material to prevent scratching of the tie rod 54 as the assembly descends relative to roller 146 while in contact therewith.

The cost of fabricating shroud repair installation tools for specific applications can be further reduced in accordance with the present invention by providing a support structure wherein support post 108 is connected to extension 104 by a clevis pin 106. By adopting this as a standard connection, the same adaptor/extension assembly (102/104) can be used interchangeably in conjunction with multiple alternative tools.

The preferred embodiments of the hydraulic pusher tool in accordance with the present invention have been disclosed for the purpose of illustration. Variations and modifications of the disclosed structure which fall within the concept of this invention will be readily apparent to persons skilled in the art of tooling design. All such variations and modifications are intended to be encompassed by the claims set forth hereinafter.

I claim:

1. A tool for pushing a mass suspended inside a reactor pressure vessel, comprising:

a pole adaptor having means for coupling to an end of a service pole, said pole coupling means being at one end of said pole adaptor;

an extension member having one end connected to another end of said pole adaptor;

a mounting member having hole means, said hole means having an axis;

a support post fixed in and coaxial with said hole means;

a pivot pin for coupling an end of said support post to an end of said extension member such that said support post and said extension member are relatively swivable about said pivot pin;

a pivoting arm pivotably mounted on said mounting member for pivoting about a first axis which is generally parallel to said support post;

a fluid-actuated drive mechanism supported by said mounting member and coupled to said pivoting arm so that said pivoting arm pivots about said first axis in a direction away from said mounting member in response to the input of pressurized fluid into said fluid-actuated drive mechanism; and a rocker plate pivotably mounted on a distal end of said pivoting arm, said rocker plate being pivotable about a second axis which is generally parallel to said first axis.

2. The tool as defined in claim 1, further comprises a saddle attached to said rocker plate.

3. The tool as defined in claim 2, wherein said saddle has a surface made of plastic material.

4. The tool as defined in claim 1, further comprises a roller pivotably mounted on said rocker plate, said roller being rotatable about a third axis which is generally perpendicular to said second axis.

5. The tool as defined in claim 4, wherein said roller has a surface of made plastic material.

6. The tool as defined in claim 1, wherein said fluid-actuated drive mechanism comprises a fluid-actuated cylinder, and said pivoting arm comprises a pivoting member which is pivotable about said first axis when said fluid-actuated cylinder is actuated and an adaptor bracket attached to said pivoting member.

7. The tool as defined in claim 4, wherein said roller has a central circumferential depression.

8. The tool as defined in claim 6, further comprising a restrictor plate attached to said adaptor bracket, wherein said restrictor plate is positioned to stop pivoting of said rocker plate about said second axis beyond a predetermined angle.

9. The tool as defined in claim 2, wherein said rocker plate comprises a base pivotably mounted on a pivot pin and an extension on one side which extends generally perpendicular to said base and beyond the portion of said saddle furthermost from said base.

10. A tool for pushing a mass suspended inside a reactor pressure vessel, comprising:

a mounting member;

a fluid-actuated spreader mounted on said mounting member and having open and closed states, said hydraulic spreader comprising a stationary member fixed to said mounting member, a fluid-actuated cylinder supported by said stationary member and a pivoting member pivotably mounted to said stationary member and coupled to said fluid-actuated cylinder, said pivoting member being pivotable about a first axis between a first angular position in said closed state and a second angular position in said open state in response to actuation of said fluid-actuated cylinder;

an adaptor bracket attached to said pivoting member by first and second fasteners and extending further away from said first axis than does said pivoting member, said adaptor bracket comprising coaxial first and second pivot pin supports;

a pivot pin supported by said first and second pivot pin supports and having a second axis which is generally parallel to said first axis;

a rocker plate pivotably mounted only on said pivot pin; and a pressurized fluid line for connecting said fluid-actuated spreader to a supply of pressurized fluid, wherein said fluid-actuated spreader transitions from said closed state to said open state in response to the supply of pressurized fluid to said pressurized fluid line.

11. The tool as defined in claim 10, further comprises a saddle attached to said rocker plate.

12. The tool as defined in claim 11, wherein said saddle has a surface made of plastic material.

13. A tool for pushing a mass suspended inside a reactor pressure vessel, comprising:

a support structure;

a fluid-actuated spreader mounted on said support structure and having open and closed states, said fluid-actuated spreader comprising a stationary member fixed to said support structure, a fluid-actuated cylinder supported by said stationary member and a pivoting member which is pivotable about a first axis between a first angular position in said closed state and a second angular position in said open state;

an adaptor bracket attached to said pivoting member;

a rocker plate pivotably mounted on a distal end of said adaptor bracket, said rocker plate being pivotable about a second axis which is generally parallel to said first axis;

a roller pivotably mounted on said rocker plate, said roller being rotatable about a third axis which is generally perpendicular to said second axis; and a pressurized fluid line for connecting said fluid-actuated spreader to a supply of pressurized fluid, wherein said fluid-actuated spreader transitions from said closed state to said open state in response to the supply of pressurized fluid to said pressurized fluid line.

14. The tool as defined in claim 13, wherein said roller has a surface made of plastic material.

15. The tool as defined in claim 13, wherein said roller has a central circumferential depression.

16. The tool as defined in claim 10, further comprising a restrictor plate attached to said adaptor bracket, wherein said restrictor plate is positioned to stop pivoting of said rocker plate about said second axis beyond a predetermined angle.

17. The tool as defined in claim 10, further comprising a support post connected to an extension by a clevis pin and connected to said mounting member.

18. The tool as defined in claim 17, further comprising a pole adaptor having means for coupling to an end of a service pole, said, said pole adaptor being connected to said extension.

19. The tool as defined in claim 11, wherein said rocker plate comprises a base pivotably mounted on a pivot pin and an extension on one side which extends generally perpendicular to said base and beyond the portion of said saddle furthermost from said base.

20. The tool as defined in claim 10, wherein said mounting member comprises contact surface means which are contoured to conform to the shape of the internal surface of a circular cylindrical structure.

\* \* \* \* \*